(12) United States Patent
Gebele et al.

(10) Patent No.: US 6,703,636 B1
(45) Date of Patent: Mar. 9, 2004

(54) DEVICE FOR READING OUT INFORMATION STORED IN A STORAGE LAYER

(76) Inventors: Herbert Gebele, Schelerweg 17, 82054 Sauerlach (DE); Juergen Mueller, Bozzarisstr. 7, 81545 Munich (DE); Werner Stahl, Ludwig-Thoma-Weg 2, 85551 Heimstetten (DE)

( * ) Notice: Subject to any disclaimer, the term of this patent is extended or adjusted under 35 U.S.C. 154(b) by 646 days.

(21) Appl. No.: 09/628,579

(22) Filed: Jul. 31, 2000

(30) Foreign Application Priority Data

Aug. 7, 1999 (GB) ............................. 199 37 416

(51) Int. Cl.[7] ............................................. G01T 1/105
(52) U.S. Cl. .................... 250/584; 250/581; 358/480; 358/496
(58) Field of Search ................. 358/480, 496, 358/497, 498; 250/584, 585, 586, 587, 581, 208.1

(56) References Cited

U.S. PATENT DOCUMENTS

| | | | | |
|---|---|---|---|---|
| 4,661,704 A | | 4/1987 | de Leeuw et al. ............ | 250/585 |
| 4,778,995 A | | 10/1988 | Kulpinski et al. ........... | 250/586 |
| 4,926,045 A | | 5/1990 | Hosoi et al. ................ | 250/585 |
| 4,953,038 A | * | 8/1990 | Schiebel et al. ............ | 358/471 |
| 5,877,508 A | * | 3/1999 | Arakawa et al. ............ | 250/588 |
| 6,310,357 B1 | * | 10/2001 | Fuchs et al. ................ | 250/587 |
| 6,369,402 B1 | * | 4/2002 | Gebele et al. ............... | 250/585 |
| 6,420,724 B1 | * | 7/2002 | Struye et al. ............... | 250/585 |
| 6,476,406 B1 | * | 11/2002 | Struye et al. ............... | 250/585 |
| 6,495,849 B2 | * | 12/2002 | Yasuda ....................... | 250/584 |
| 6,528,812 B1 | * | 3/2003 | Leblans et al. ............. | 250/588 |

FOREIGN PATENT DOCUMENTS

| | | |
|---|---|---|
| DE | 2951501 | 7/1980 |
| DE | 3731203 | 3/1989 |
| DE | 69316248 | 1/1998 |
| DE | 69412385 | 8/1998 |
| EP | 0776126 | 5/1997 |
| EP | 0777148 | 6/1997 |

OTHER PUBLICATIONS

U.S. patent application Ser. No. 09/449,877, Gebele et al.

"Luftlagerungen", Band 78 Kontakt & Sudium Mit 185 Bildern und 127 Literaturstellen 2, voeliig neubearbeitete und erweiterte Auflage.

"Segmented Air Bearing in Micro Nozzel Technology for the Project SOFIA", Inter. Symposium on Optical Science, Engineering and Instrumentation (San Diego, 1977) Proceedings of SPIE vol. 3122.

* cited by examiner

Primary Examiner—Cheukfan Lee
(74) Attorney, Agent, or Firm—Milde & Hoffberg, LLP

(57) ABSTRACT

A device for reading out information stored in a storage layer (10), which facilitates a good reproduction quality of this information stored in the storage layer (10). The device (1) includes a radiation source (2) for emitting stimulation radiation (20). Using this stimulation radiation (20), the storage layer (10) is stimulated to emit an emission radiation that corresponds to the information stored in the storage layer (10). The device (1) further includes a receiving device (3) to receive this emission radiation emitted by the storage layer (10). A distance device (30, 56) for setting a prespecified distance (28, 59) is located between the receiving device (3) and the storage layer (10). A drive device imparts relative movement in a transport direction (A) between the radiation source (2) and the receiving device (3), on one hand, and the storage layer (10) on the other.

43 Claims, 3 Drawing Sheets

DEVICE FOR READING OUT INFORMATION STORED IN A STORAGE LAYER

BACKGROUND OF THE INVENTION

The present invention relates to a device for reading out information stored in a storage layer. The device includes a radiation source for emitting a stimulation radiation, and a receiving device for receiving emission radiation emitted by the storage layer.

Especially for medical purposes, x-radiation is used to generate an image of an object, for example a patient, where said image is stored as a latent image in a storage layer. Most often, a phosphor carrier is used as the storage layer. The storage layer is stimulated using a radiation source to read out the x-radiation image stored in the storage layer. According to the stimulation, it will emit light with an intensity in proportion to the stored x-radiation image. The light emitted by the storage layer is received by a detection device and then converted into electrical signals such that the x-radiation image stored in the storage layer can then be made visible. For example, the x-radiation image may be presented directly on a monitor or it can be written onto a photographic x-ray film that is specifically applicable to x-ray images. Such an apparatus for reading out information stored in a storage layer is known, for example, from the published German Patent Application No. DE 197 52 925 A1. In this device, the light emitted by the storage layer is to be reproduced very precisely on the receiving device. The distance between the storage layer and the receiving device is kept to a minimum to increase the degree of compactness.

SUMMARY OF THE INVENTION

It is the principal objective of the present invention to enable a good quality reproduction of the information stored in a storage layer, such as a phosphor layer in an x-ray device.

This objective, as well as other objectives which will become apparent from the discussion that follows, are achieved by providing (a) a "distance device", located between the receiving device and the storage layer, for setting a pre-specified distance between the receiving device and the storage layer, and (b) a "drive device" for imparting relative movement between the radiation source and the receiving device, on one hand, and the storage layer on the other.

According to the present invention, it is ensured that a pre-specified distance can be maintained between the receiving device and the storage layer. Preferably this distance is maintained as constant as possible and, furthermore, allows for very small settings by using the distance device such that a large amount of the radiation emitted by the stimulated storage layer can be detected by the receiving device. The distance device permits undesirable fluctuations of the distance that may occur to be quickly compensated. Such changes in distance may occur, for example, when the surface of the storage layer exhibits inaccuracies caused by the manufacturing process, or when external vibrations or impacts affect the device, which in turn affects the distance between the receiving device and the storage layer. Due to the distance device, contact between the storage layer and the receiving device, and thus a potential scratching, can be avoided. Furthermore, when presenting the x-ray image that was read out from the storage layer, artifact generation, a deviation of the local resolution and/or a bad image focus can be largely avoided.

According to the present invention, the reading device further incorporates a mechanism for imparting relative movement between the radiation source and the receiving device, on one hand, and the storage layer on the other. In this manner, the storage layer can be read out line by line such that the stored information is detected and converted into electrical signals.

Preferably, the distance device contains an air layer. With such an air layer, very small distances between the storage layer and the receiving device can be set. Air nozzles that are contained in the distance device can generate the air layer easily and precisely. These air nozzles are connected to an air supply.

In one advantageous embodiment of the invention, the device exhibits a transparent carrier material with the storage layer applied to this carrier. Thus, the receiving device is located on one side of the storage layer and the radiation source on the other. Another distance device can then be provided between the radiation source and the storage layer. This is particularly advantageous when a relative movement for exciting the storage layer is carried out between the storage layer and the radiation source, because contact between the radiation source and the storage layer can be avoided in this manner.

In another advantageous embodiment of the invention, the device exhibits a force mechanism, in particular a spring that can apply a force from the receiving device in the direction of the storage layer. This allows the reading device according to the invention to be used regardless of its position. The force mechanism provides a force for suitable setting of the distance, regardless of the direction of the forces of gravity affecting the receiving device.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
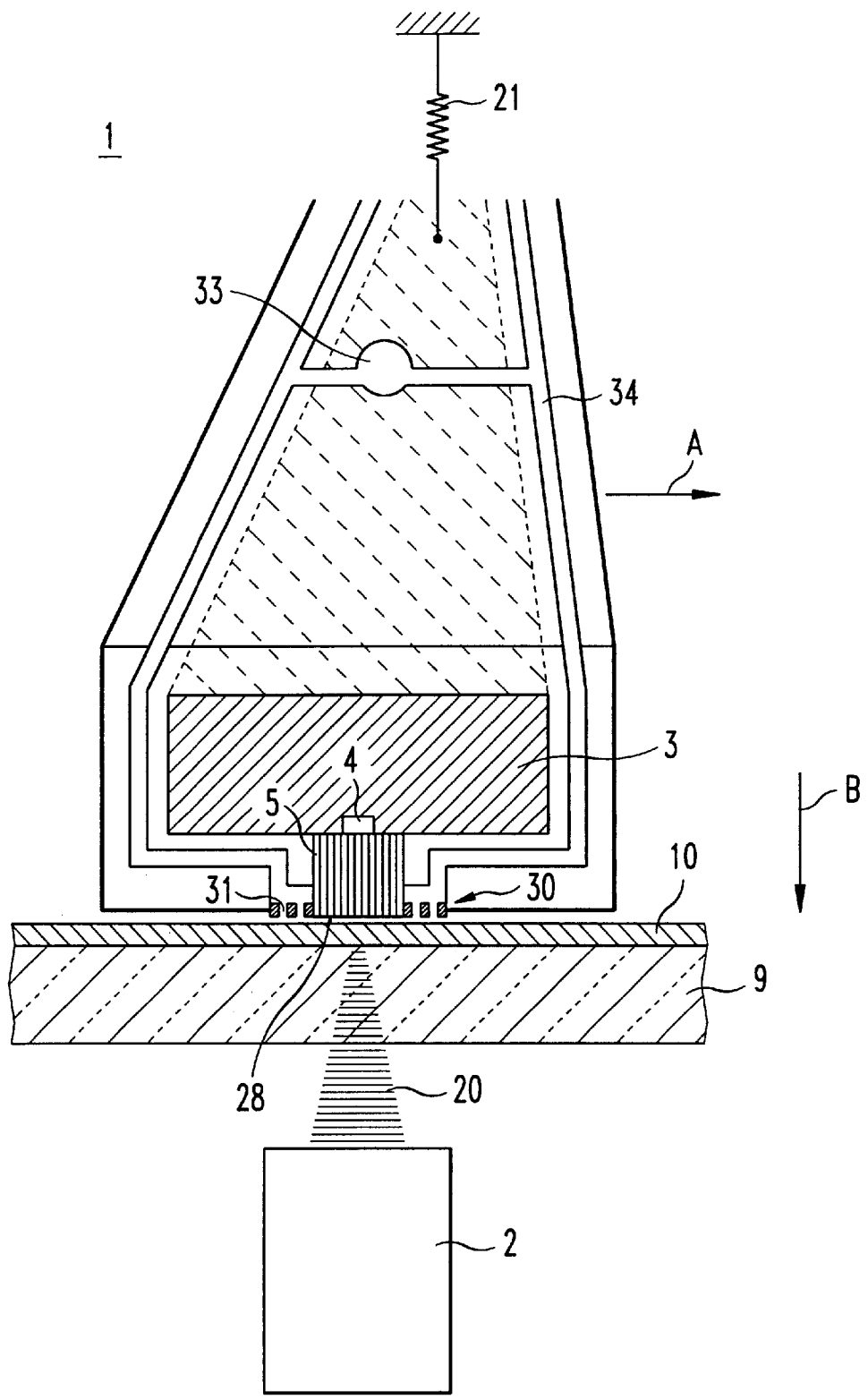
FIG. 1 shows a first preferred embodiment of the reading device according to the invention with a distance device between the storage layer and the receiving device.

The preferred embodiments of the present invention will now be described with reference to FIGS. 1–3 of the drawings. Identical elements in the various figures are designated with the same reference numerals.

FIG. 1 is a schematic presentation of the first preferred embodiment of a reading device 1 according to the invention with a phosphor layer 10 applied to a transparent carrier material 9. The phosphor layer 10 serves as the storage layer, where a latent x-ray image is stored using x-radiation. This latent x-ray image can be read out from the phosphor layer 10 by using a reading device 1 and can be processed for display on a monitor or an x-ray film.

To this end, the reading device 1 exhibits a radiation source 2, which is here designed as a line light source and contains a multitude of laser diodes arranged next to one another. The radiation source 2 contains 4096 laser diodes arranged parallel next to one another in one line. Using these laser diodes, a line of the phosphor layer 10 can be stimulated to emit radiation. Representative, one laser beam 20 that is emitted by one of the laser diodes of the radiation source 2 in the direction of the phosphor layer 10 is drawn in FIG. 1. As much as possible, the laser diodes of the radiation source 2 are oriented perpendicular to the phosphor layer 10 such that the radiation emitted by the individual laser diodes strikes the phosphor layer 10 directly. In general, the radiation source 2 stretches across the entire width of the phosphor layer 10, where information can be stored. Another radiation source may be used in place of the radiation source 2 that is equipped with laser diodes. For example, FIG. 3 further down shows an exemplary embodiment with a so-called "flying spot" laser radiation source.

Using the line-shaped radiation source 2, a line of the phosphor layer 10 can be stimulated to emit radiation that emits information according to the portion of the x-ray image contained in this stimulated line. Furthermore, to detect the light radiation emitted by the stimulated line of the phosphor layer, the reading device 1 includes a charge coupled device (CCD) line. This CCD line 3 contains numerous photodetectors arranged parallel next to one another in one line. These photodetectors can be used to perform a photoelectric conversion of the received light radiation. Each photodetector represents a point element of the receiving device and can receive one light beam emitted from one of the stimulated points of the phosphor layer 10. Thus, 4096 individual photodetectors are provided in the CCD line 3 of the first preferred embodiment according to FIG. 1.

A light waveguide bundle 5 stretching across the entire width of the CCD line 3 is located between the phosphor layer 10 and the CCD line 3. The light waveguide bundle 5 contains numerous light waveguides arranged parallel next to one another that capture the radiation emitted by the individual stimulated points of the phosphor layer 10 and guides it to the individual photodetectors of the CCD line 3.

Representative, FIG. 1 shows one photodetector 4 that receives the radiation that is emitted by the phosphor layer 10 due to the laser radiation 20 emitted by one of the laser diodes of the radiation source 2. At least one light waveguide is assigned to each of the photodetectors of the CCD line 3.

Light waveguide bundles 5 that can be used to reproduce and transport the light radiation emitted by the phosphor layer to the photodetectors of the CCD line 3 are known and can be obtained from the company Schott as "fused fiberoptic faceplates", for example. Advantageously, the light waveguide bundle 5 can be doped such that it can operate simultaneously as a filter for the laser radiation that is emitted by the laser radiation source 2 and that passes through the phosphor layer 10. Other means of reproduction, such as a so-called Selfoc lens array or a respective array of microlenses, can be used in place of the light waveguide bundle.

Here, the light waveguide bundle 5 and the CCD line 3 represent the receiving device for receiving the light radiation emitted by the phosphor layer 10. The CCD line 3 and the light waveguide bundle 5 are located on that side of the carrier material 9 where the phosphor layer 10 is applied. In this manner, the light waveguide bundle 5 can be located very close to the phosphor layer 10 for better detection of the light radiation emitted by the phosphor layer 10. The radiation source 2 is located on the other, opposite side of the carrier material 9 without a phosphor layer. The laser radiation emitted by the radiation source 2 for stimulating the phosphor layer 10 is directed through the carrier material 9 to the phosphor layer 10, if possible without dispersion. The light wave guide bundle 5 is placed directly onto the CCD line 3 and is advantageously positioned as close as possible to the phosphor layer 10 in order to gather as much light radiation as possible that is emitted by the phosphor layer after its stimulation.

According to the invention, an air bearing 30 is provided between the surface of the phosphor layer 10 and the CCD line 3. This air bearing 30 serves as a "distance device" for setting the pre-specified distance between the light waveguide bundle 5 and the surface of the phosphor layer 10. The air bearing 30 exhibits several air nozzles 31 arranged parallel, next to one another. Via air channels 34, these air nozzles 31 are connected to an air inlet 33. Air is supplied to the air nozzles 31 via the air inlet 33 and the air channels 34. This supplied air is provided by the air nozzles 31 in the direction of the phosphor layer 10 at a certain pressure. In this manner, a pre-specified distance is formed between the air nozzles and the phosphor layer 10. This distance results in an air gap 28 between the light wave guide bundle 5 and the phosphor layer 10. This distance should be as small as possible. A very small distance of about 10 $\mu$m can be set by using the air bearing 30. This insures a high optical collection efficiency for detecting the light emitted by the phosphor layer 10, which enables an outstanding reproduction quality of the read-out x-ray image. Other types of bearings such as friction bearings or roller bearings or even a combination of various bearing types can be used in place of an air bearing.

In this preferred embodiment, the air nozzles 31 are located on both sides of the light waveguide bundle 5. Shape and size of the air bearing 30 can be selected as desired. For example, the air bearing 30 can stretch along the entire width of the line to be read out, or as relatively small air bearings they can be located only at the face sides of the receiving device; that is, the CCD line 3 and the light waveguide bundle 5. Advantageously, the air bearing 30 can be designed as a bearing that can move along the direction of the line. In this manner, manufacturing inaccuracies and small "deflections" of the receiving device that can occur due to its weight can be compensated.

Basically, a balance of forces forms the air gap 28. This comes into existence through a pressure force generated by the air. layer in the direction of the light waveguide bundle 5 and by the gravitational forces of the CCD line 3, the air supply system 33, 34 and the light waveguide bundle 5 in the direction of the phosphor layer 10. A separate force mechanism can be used to amplify the force that is applied by the light waveguide bundle 5 and the CCD line 3 in the direction of the phosphor layer 10. This force mechanism can be a spring 21 for simplicity sake, in particular a flat spring. Here, this spring 21 is mounted between the CCD line 3 and a surrounding housing not shown here, for example the housing of the reading device 1. In this manner, it is possible to set a very stable force balance, and thus, a very stable distance between the light waveguide bundle 5 and the phosphor layer 10. The spring 21 is designed such that its force is effective in a force direction B in the direction of the phosphor layer 10 and, in this manner, increases the pressure on the air layer in the air gap 28. Due to the high pressure, the surface of the phosphor layer 10 is additionally smoothed which further improves setting the distance of the pre-specified distance between the phosphor layer 10 and the light waveguide bundle 5. By using the spring 21, the application of the reading device 1 becomes independent of its position. The air bearing 30 can set the air gap 28 precisely in vertical, horizontal or any other position of the reading device.

To read out the entire phosphor layer 10 with the reading device 1, the radiation source 2 is moved, line by line, in a transport direction A, together with the receiving device with CCD line 3 that is located at the opposite side of the phosphor layer 10, the light waveguide bundle 5 and the air bearing 30. For this purpose it is advantageous that the receiving device 3, 5, and the radiation source 2 have a fixed connection. In this manner, one line of the phosphor layer 10 after the other is read out and the information stored in it is detected and converted into electrical signals.

Air bearings that can be used in the reading device 1 for creating a distance between the receiving device and the radiation source 2 are basically known and can be obtained, for example, from the company AeroLas GmbH of Unterhaching, Germany. Furthermore, such air bearings are described in the book *Luftlagerungen* [Air Bearings] by Wilfried J. Bartz et al., Expertverlag, Second Edition, 1963.

Figure 2:
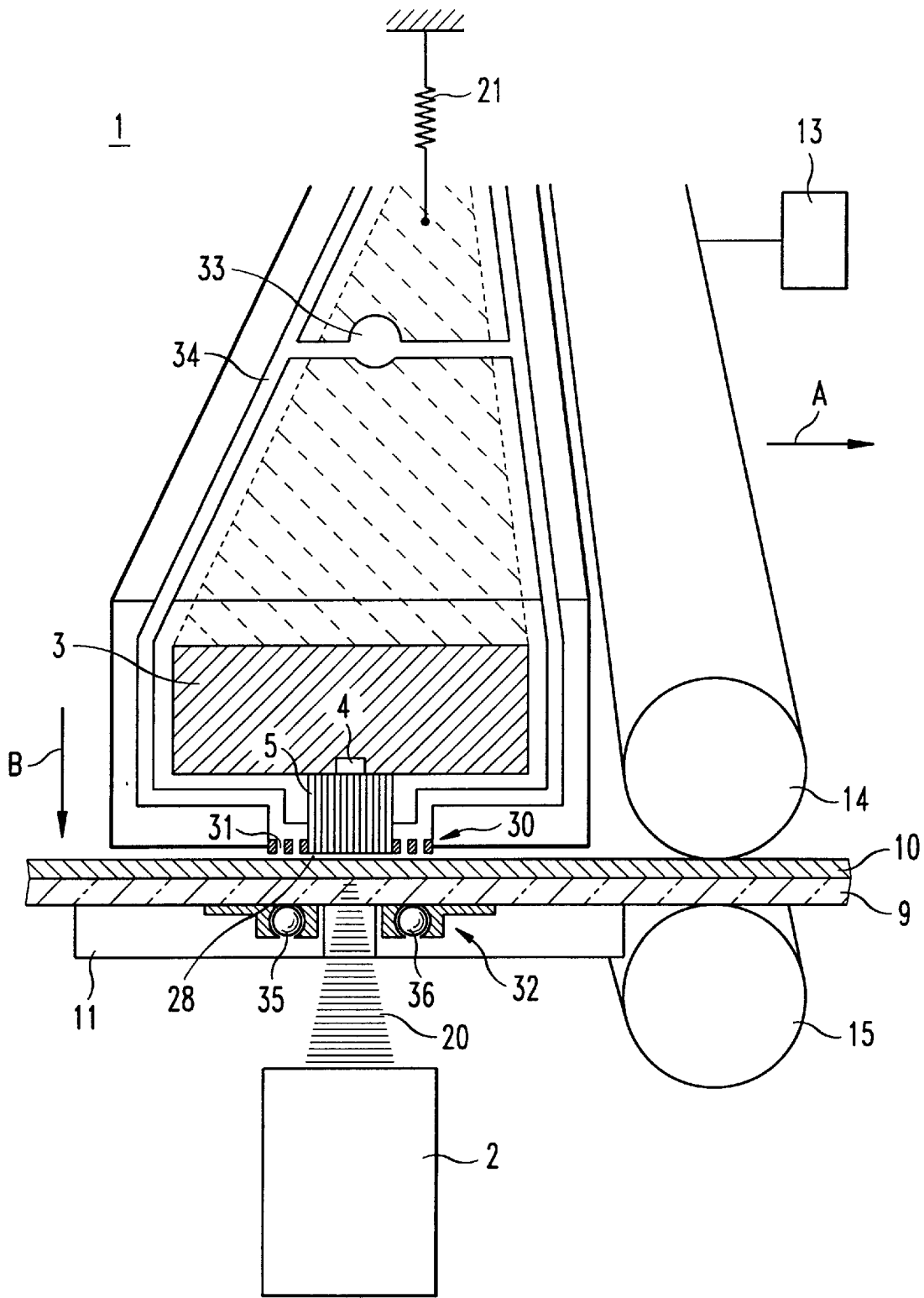
FIG. 2 shows a second preferred embodiment of the reading device according to the invention with another distance device between the radiation source and the storage layer.

FIG. 2 is a schematic presentation of the second preferred embodiment of the reading device 1. In addition to the first exemplary embodiment of the reading device 1—as described using FIG. 1—the reading device 1 according to FIG. 2 exhibits an additional air bearing 32 that is located between the transparent carrier material 9 and the radiation source 2. The design of this additional air bearing 32 corresponds essentially to that of the air bearing 30 that is located between the phosphor layer 10 and the CCD line 3 or the light wave guide bundle 5. It can have its own air supply, which is not shown here. However, it is also possible to couple the additional air bearing 32 with the air supply of the air bearing 30.

Here, the additional air bearing 32 is integrated in a base 11, where, among others, the radiation source 2 is located. This base 11 serves as guide for the transparent carrier material 9 and the phosphor layer 10 that is applied to this carrier. This is of particular importance when the transparent carrier material 9 and the phosphor layer 10 that is applied to it is being moved during the read-out of the x-ray image stored in the phosphor layer 10 and the radiation source 2, that is, the CCD line 3 together with the light wave guide bundle 5, is firmly located in the reading device 1.

Preferably, the additional air bearing 32 that is imbedded in the base 11 contains two spheres, 35 and 36. These two spheres, 35 and 36 serve the purpose of sealing the air nozzles present in the additional air bearing 32. If a phosphor layer together with the transparent carrier material 9 is inserted into the reading device 1, then the two spheres 35 and 36 will be pressed down and the supplied air can flow out of the air nozzles. If the air gap between the carrier material 9 and the base 11 increases, for example, due to vibrations, bending of the phosphor layer 10 and carrier material 9, or through increased air supply from the air nozzles, and thus, increased air pressure, then the spheres 35 and 36 are automatically, at least partially, pressed back into the exit openings of the air nozzles. This, in turn, reduces the air pressure, and the air gap between carrier material 9 and base 11 returns to the desired specified distance. Conversely, the spheres 35 and 36 bring about an increased air supply into the air gap of the air bearing 32 if the air gap becomes too small. The spheres 35 and 36 serve the purpose of controlling the size of the air gap of the air bearing 32. Thus, the friction between base 11 and carrier material 9 can be kept low. The ability to prevent scratching of the carrier material 9 and the phosphor layer 10 when reading out the phosphor layer 10 is improved.

Especially in the case where the phosphor layer 10 together with the transparent carrier material 9 is transported through the reading device 1, it is advantageous if the pressure of the CCD line 3 together with the light wave guide bundle 5 onto the phosphor layer 10 is particularly large. In this manner, the phosphor layer 10 is pressed onto the carrier material 9 and smoothed during the read-out. In this manner, thickness fluctuations of the phosphor layer 10 can be, at least partially, compensated. The distance 28 can be set precisely when transporting the phosphor layer 10 in the transport direction A for reading out the x-ray image stored in the phosphor layer. The distance to be maintained between the carrier material 9 and the base 11 that is set using the air bearing 32 does not necessarily need to be set as accurately as the distance between the phosphor layer 10 and the light wave guide bundle 5.

To drive the phosphor layer 10 and the transparent carrier material 9 in the transport direction A, the reading device 1 features a first transport roller 14 located above the phosphor layer 10 and a second transport roller 15 located below the transparent carrier material 9. The transport rollers can be controlled and turned using a drive motor 13 with which they are connected. This can advance the phosphor layer in the direction A. However, other types of drives can be used as well.

Figure 3:
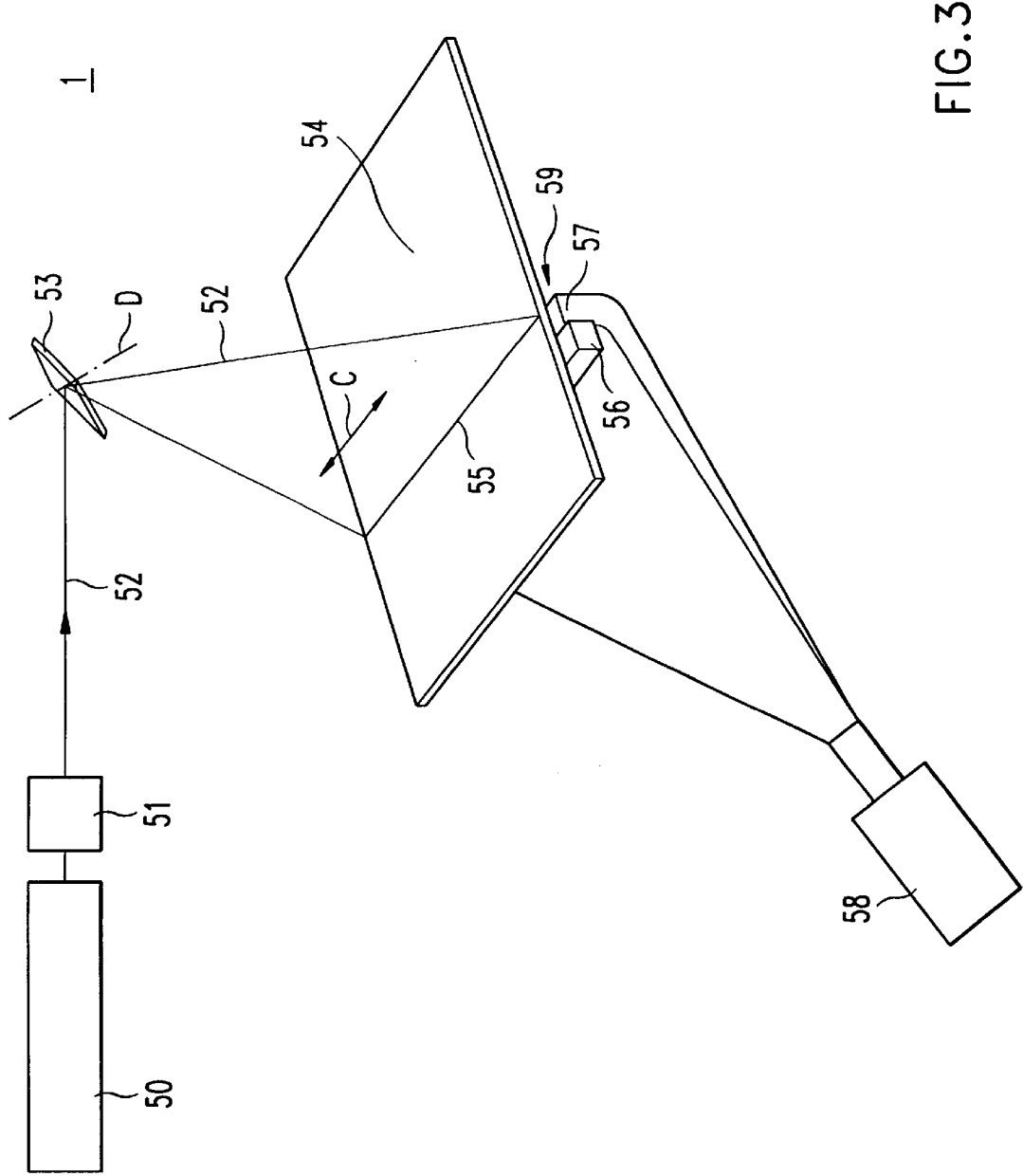
FIG. 3 shows a third preferred embodiment of the device according to the invention with a so-called "flying spot" laser system as the radiation source.

FIG. 3 is a schematic presentation of a third preferred embodiment of the present invention. Here, the reading device is designed as a so-called "flying spot" laser system. The basic design of such a "flying spot" laser system is already known, for example, from the European patent application EP 0 777 148 A1.

FIG. 3 shows a laser 50 that emits a laser beam 52. Using a collimator 51, this laser beam 52 is directed to a polygon mirror 53 that rotates around a rotating axis D. The polygon mirror 53 directs the laser beam 52 in the direction of a phosphor layer 54. By rotating the polygon mirror around the rotating axis D, the laser beam 52 is directed along a line expansion direction C. In this manner, each point of a line of phosphor layer 54 is stimulated in succession. The phosphor layer 54 advances line by line such that it can be read out line by line. The light emitted by the phosphor layer 54 due to the stimulation with the laser beam 52 is collected by a fiber cross-section converter 57 that contains light guides and is provided to a photo detector 58. In this manner, the x-ray image stored in the phosphor layer 54 is read out point by point and line by line.

According to the invention, the read-out device 1 as set forth in the third exemplary embodiment exhibits a third air bearing 56 that is located on the longitudinal side of the fiber cross-section converter 57 along the line direction C. The design of this additional air bearing 56 is essentially the same as that of the two air bearings 30 and 32 of the first and second exemplary embodiments. Using the third air bearing 56, a small air gap 59 is formed between the phosphor layer 54 and the fiber cross-section converter 57. This again can prevent contact between the phosphor layer 54 and the fiber cross-section converter 57 during the advance movement of the phosphor layer 54. Due to the air gap 59, a small and consistent distance can also be set between phosphor layer 54 and fiber cross-section converter 57 in the reading device 1 according to the third exemplary embodiment.

The reading device according to the exemplary embodiments described above can be designed in autonomous fashion, for example, in the form of an x-ray cassette that contains all the required described components for reading out the phosphor layer. However, it is also possible to integrate the described reading device 1 in an x-ray examination table.

The phosphor layer, the radiation source and the receiving device can all be integrated in such an x-ray examination table.

There has thus been shown and described a novel device for reading out information stored in a storage layer which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for reading out information stored in a storage layer, said device comprising:
   (a) a radiation source for emitting a stimulation radiation;
   (b) a receiving device for receiving emission radiation emitted by the storage layer;
   (c) a drive device for imparting relative movement in a transport direction between the receiving device and the storage layer;
the improvement comprising a distance device disposed between the receiving device and the storage layer for maintaining a prescribed distance between the receiving device and the storage layer, during said relative movement imposed by the drive device, and for providing an air layer between the receiving device and the surface of the storage layer.

2. Device as set forth in claim 1, wherein the distance device includes air nozzles.

3. Device as set forth in claim 1, further comprising a transparent carrier layer applied to the storage layer, and wherein the radiation source is located on the side of the carrier layer that is opposite the storage layer and the receiving device is located on that side of the carrier layer that is adjacent to the storage layer.

4. Device as set forth in claim 1, further comprising an additional distance device disposed between the radiation source and the storage layer.

5. Device as set forth in claim 1, wherein the storage layer is fixedly mounted in the device.

6. Device as set forth in claim 1, wherein the receiving device includes an optical transducing device that can receive the emission radiation emitted by the stimulated storage layer.

7. Device as set forth in claim 6, wherein the transducing device includes light waveguides.

8. Device as set forth in claim 1, wherein the radiation source is a line light source for stimulating one line of the storage layer and the receiving device includes a plurality of pixel elements disposed at a plurality of adjacent points along a line, for receiving the emission radiation at said plurality of points, whereby the emission radiation emitted by the stimulated line of the storage layer is received by the pixel elements.

9. Device as set forth in claim 1, further including means for applying a force from the receiving device to the distance device in the direction of the storage layer.

10. Device as set forth in claim 9, wherein said force applying means includes a spring.

11. Device as set forth in claim 1, wherein the radiation source and the receiving device are mechanically connected together.

12. A device for reading out information stored in a storage layer, said device comprising:
   (a) a radiation source for emitting a stimulation radiation;
   (b) a receiving device for receiving emission radiation emitted by the storage layer;
   (c) a drive device for imparting relative movement in a transport direction between the receiving device and the storage layer;
the improvement comprising a first distance device disposed between the receiving device and the storage layer for maintaining a prescribed distance between the receiving device and the storage layer, during said relative movement imposed by the drive device, and comprising a second distance device disposed between the radiation source and the storage layer for maintaining a prescribed distance between the radiation source and the storage layer.

13. Device as set forth in claim 12, wherein the first distance device provides an air layer between the receiving device and the surface of the storage layer.

14. Device as set forth in claim 13, wherein the first distance device includes air nozzles.

15. Device as set forth in claim 12, further comprising a transparent carrier layer applied to the storage layer, and wherein the radiation source is located on the side of the carrier layer that is opposite the storage layer and the receiving device is located on that side of the carrier layer that is adjacent to the storage layer.

16. Device as set forth in claim 12, wherein the storage layer is fixedly mounted in the device.

17. Device as set forth in claim 12, wherein the receiving device includes an optical transducing device that can receive the emission radiation emitted by the stimulated storage layer.

18. Device as set forth in claim 17, wherein the transducing device includes light waveguides.

19. Device as set forth in claim 12, wherein the radiation source is a line light source for stimulating one line of the storage layer and the receiving device includes a plurality of pixel elements disposed at a plurality of adjacent points along a line, for receiving the emission radiation at said plurality of points, whereby the emission radiation emitted by the stimulated line of the storage layer is received by the pixel elements.

20. Device as set forth in claim 12, further including means for applying a force from the receiving device to the distance device in the direction of the storage layer.

21. Device as set forth in claim 20, wherein said force applying means includes a spring.

22. Device as set forth in claim 12, wherein the radiation source and the receiving device are mechanically connected together.

23. A device for reading out information stored in a storage layer, said reading device comprising:
   (a) a radiation source for emitting a stimulation radiation;
   (b) a receiving device for receiving emission radiation emitted by the storage layer;
   (c) a drive device for imparting relative movement in a transport direction between the receiving device and the storage layer;
the improvement comprising a distance device disposed between the receiving device and the storage layer for maintaining a prescribed distance between the receiving device and the storage layer, during said relative movement imposed by the drive device, and wherein the storage layer is fixedly mounted in the reading device.

24. Device as set forth in claim 23, wherein the distance device provides an air layer between the receiving device and the surface of the storage layer.

25. Device as set forth in claim 24, wherein the distance device includes air nozzles.

26. Device as set forth in claim 23, further comprising a transparent carrier layer applied to the storage layer, and wherein the radiation source is located on the side of the carrier layer that is opposite the storage layer and the receiving device is located on that side of the carrier layer that is adjacent to the storage layer.

27. Device as set forth in claim 23, further comprising an additional distance device disposed between the radiation source and the storage layer.

28. Device as set forth in claim 23, wherein the receiving device includes an optical transducing device that can receive the emission radiation emitted by the stimulated storage layer.

29. Device as set forth in claim 28, wherein the transducing device includes light waveguides.

30. Device as set forth in claim 23, wherein the radiation source is a line light source for stimulating one line of the storage layer and the receiving device includes a plurality of pixel elements disposed at a plurality of adjacent points along a line, for receiving the emission radiation at said plurality of points, whereby the emission radiation emitted by the stimulated line of the storage layer is received by the pixel elements.

31. Device as set forth in claim 23, further including means for applying a force from the receiving device to the distance device in the direction of the storage layer.

32. Device as set forth in claim 31, wherein said force applying means includes a spring.

33. Device as set forth in claim 23, wherein the radiation source and the receiving device are mechanically connected together.

34. A device for reading out information stored in a storage layer, said device comprising:

(a) a radiation source for emitting a stimulation radiation;

(b) a receiving device for receiving emission radiation emitted by the storage layer;

(c) a drive device for imparting relative movement in a transport direction between the receiving device and the storage layer;

the improvement comprising a distance device disposed between the receiving device and the storage layer for maintaining a prescribed distance between the receiving device and the storage layer, during said relative movement imposed by the drive device, and comprising spring means for applying a force from the receiving device to the distance device in the direction of the storage layer.

35. Device as set forth in claim 34, wherein the distance device provides an air layer between the receiving device and the surface of the storage layer.

36. Device as set forth in claim 35, wherein the distance device includes air nozzles.

37. Device as set forth in claim 34, further comprising a transparent carrier layer applied to the storage layer, and wherein the radiation source is located on the side of the carrier layer that is opposite the storage layer and the receiving device is located on that side of the carrier layer that is adjacent to the storage layer.

38. Device as set forth in claim 34, further comprising an additional distance device disposed between the radiation source and the storage layer.

39. Device as set forth in claim 34, wherein the storage layer is fixedly mounted in said reading device.

40. Device set forth in claim 34, wherein the receiving device includes an optical transducing device that can receive the emission radiation emitted by the stimulated storage layer.

41. Device as set forth in claim 40, wherein the transducing device includes light waveguides.

42. Device as set forth in claim 34, wherein the radiation source is a line light source for stimulating one line of the storage layer and the receiving device includes a plurality of pixel elements disposed at a plurality of adjacent points along a line, for receiving the emission radiation at said plurality of points, whereby the emission radiation emitted by the stimulated line of the storage layer is received by the pixel elements.

43. Device as set forth in claim 34, wherein the radiation source and the receiving device are mechanically connected together.

\* \* \* \* \*